United States Patent [19]
Matsushita et al.

[11] Patent Number: 6,072,481
[45] Date of Patent: Jun. 6, 2000

[54] ELECTRONIC CATALOG DATA CREATING AND/OR DISPLAYING APPARATUS AND METHOD

[75] Inventors: Seitaro Matsushita; Masatoshi Itoh, both of Tokyo; Mamoru Kawanobe, Higashiyamato, all of Japan

[73] Assignee: Comnes Co., Ltd, Tokyo, Japan

[21] Appl. No.: 09/149,111

[22] Filed: Sep. 9, 1998

[30] Foreign Application Priority Data

Sep. 10, 1997 [JP] Japan ..................................... 9-262853

[51] Int. Cl.[7] ............................... G06F 3/00; G06F 17/60
[52] U.S. Cl. .......................... 345/326; 345/962; 345/964; 707/506; 705/27; 700/214
[58] Field of Search .................................... 345/326, 339, 345/967, 962, 340, 964, 333, 335; 705/26, 27, 28, 29; 707/503, 506, 505; 700/103, 104, 214, 216

[56] References Cited

U.S. PATENT DOCUMENTS

| | | | |
|---|---|---|---|
| 4,972,318 | 11/1990 | Brown et al. ............................. | 705/26 |
| 4,992,940 | 2/1991 | Dworkin .................................. | 705/26 |
| 5,295,067 | 3/1994 | Cho et al. ................................ | 705/29 |
| 5,307,260 | 4/1994 | Watanabe et al. ..................... | 705/29 X |
| 5,504,674 | 4/1996 | Chen et al. .......................... | 345/340 X |
| 5,699,526 | 12/1997 | Siefert ..................................... | 705/27 |
| 5,717,595 | 2/1998 | Cherrington et al. ................. | 705/29 X |
| 5,875,110 | 2/1999 | Jacobs .................................. | 700/216 X |
| 5,890,175 | 3/1999 | Wong et al. ............................ | 707/505 |

*Primary Examiner*—Raymond J. Bayerl
*Attorney, Agent, or Firm*—Greenblum & Bernstein, P.L.C.

[57] ABSTRACT

The present invention relates to an electronic catalog data creating and/or displaying apparatus and method. The electronic catalog data creating apparatus comprises a user interface through which a user enters parts data and a data converter which converts data, entered through the user interface, to a predetermined data format. The user interface, in turn, comprises a property data input unit for receiving part property characteristics and its contents and a value range input unit for receiving the range of input or presentation values or presentation conditions of each property entered through the property data input unit. The value range input unit also has a plurality of fields, each of which will accept the following three code descriptions: a code description indicating a value range check condition, a code description indicating a value range to be used when the value range check condition is satisfied, and a code description indicating a value range to be used when the value range check condition is not satisfied. On the other hand, the data converter comprises a condition expression converting unit. The condition expression converting unit searches for a code entered through the value range input unit and converts the value range check condition or the value range to a predetermined data structure description according to a specified content indicated by the code.

18 Claims, 15 Drawing Sheets

FIG.3

| | PROPERTY A | PROPERTY B | PROPERTY C | PROPERTY D |
|---|---|---|---|---|
| PART1 | 20 | FORMAT1 | 10 | 5 |
| PART2 | 20 | FORMAT1 | 12 | 5 |
| PART3 | 20 | FORMAT1 | 15 | 15 |
| PART4 | 20 | FORMAT1 | 17 | 15 |
| PART5 | 20 | FORMAT1 | 20 | 15 |
| PART6 | 20 | FORMAT1 | 22 | 20 |
| PART7 | 20 | FORMAT1 | 25 | 20 |
| PART8 | 20 | FORMAT1 | 27 | 20 |

FIG.6

| NAME | SHORT NAME | UNIT | DATA TYPE |
|---|---|---|---|
| DESIGNATION OF SCREW THREAD | d | MILLIMETER | REAL |
| NOMINAL LENGTH | L | MILLIMETER | REAL |
| THREAD LENGTH | b | MILLIMETER | REAL |
| TRANSITION DIAMETER | da | MILLIMETER | REAL |
| DIAMETER OF THE UNTHREADED SHANK | ds | MILLIMETER | REAL |
| DIAMETER OF THE WASHER FACE | dw | MILLIMETER | REAL |
| WIDTH ACROSS CORNERS | e | MILLIMETER | REAL |
| TRANSITION LENGTH | Lf | MILLIMETER | REAL |
| HEIGHT OF HEAD | k | MILLIMETER | REAL |
| RADIUS OF CURVATURE UNDER HEAD | r | MILLIMETER | REAL |
| WIDTH ACROSS FLATS | s | MILLIMETER | REAL |
| THREAD PITCH | P | MILLIMETER | REAL |

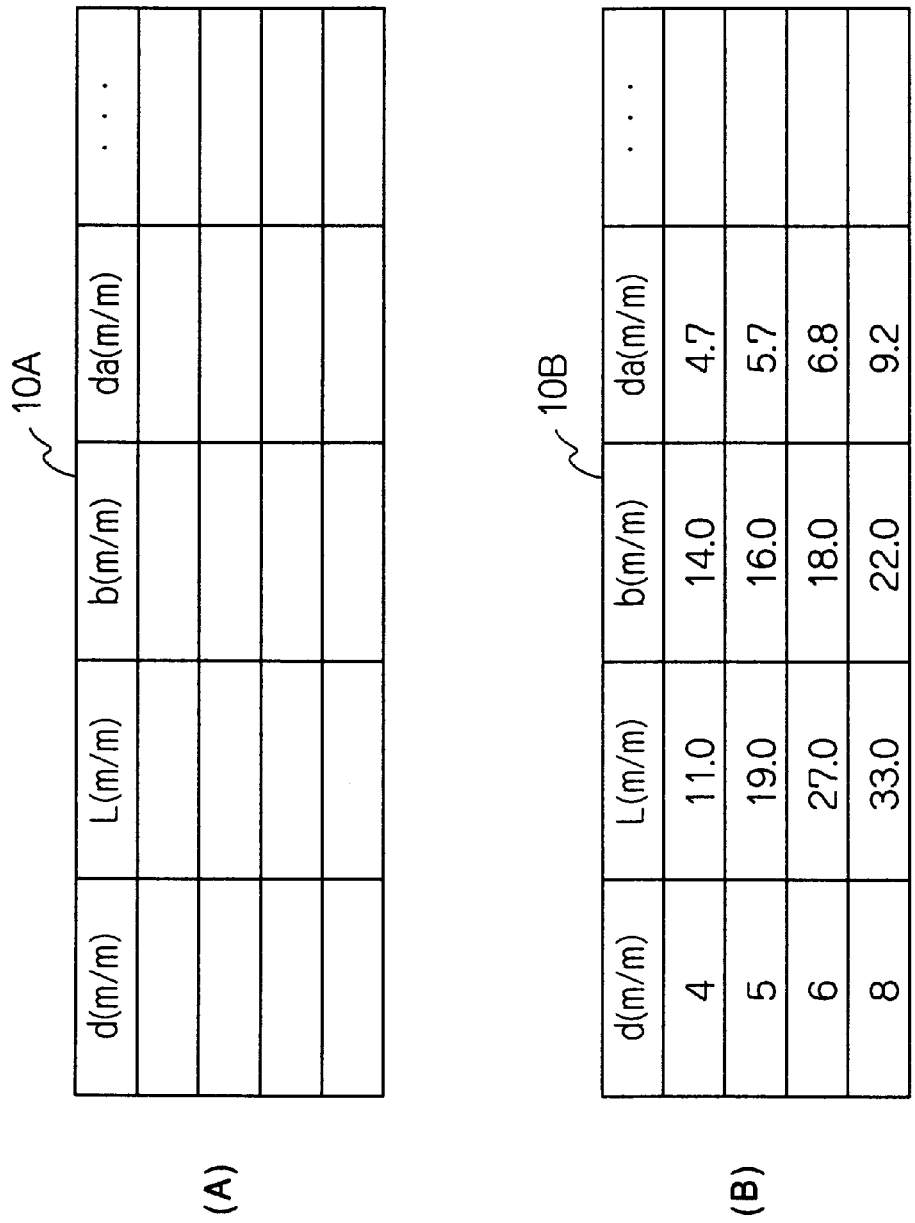

FIG. 9

| | |
|---|---|
| DATA DESCRIPTION SECTION | #1266= DOMAIN_RESTRICTION ((#1316),(#1270),(#1265,#1259),$); |
| CONDITION AND VALUE RANGE DESCRIPTION SECTION | #1265= GUARDED_SIMPLE_DOMAIN (#1264,#1261); |
| CONDITIONAL EXPRESSION | #1264= COMPARISON_EQUAL (#1263,#1262); |
| VARIABLE USED IN CONDITIONAL EXPRESSION | #1263= STRING_VARIABLE (); |
| CONSTANT USED IN CONDITIONAL EXPRESSION | #1262= STRING_LITERAL ('SINGLE-ROW DEEP-GROOVE BALL BEARING'); |
| VALUE RANGE DEFINITION DESCRIPTION SECTION | #1261= TABLE_DEFINED_DOMAIN (#1260); |
| VALUE RANGE DEFINITION | #1260= TABLE_LITERAL (#1090); |
| CONDITION AND VALUE RANGE DESCRIPTION SECTION | #1259= GUARDED_SIMPLE_DOMAIN (#1258,#1257); |
| CONDITIONAL EXPRESSION (IDENTICAL TRUE) | #1258= OTHERS() ; |
| VALUE RANGE DEFINITION DESCRIPTION SECTION | #1257= TABLE_DEFINED_DOMAIN (#1256); |
| VALUE RANGE DEFINITION | #1256= TABLE_LITERAL (#1089); |
| VARIABLE ASSOCIATION | #1255= ENVIRONMENT (#1263,#1270); |

FIG.10
(A)
```
REQUIREMENT:
    THE VALUE OF VARIABLE #1270 IS KNOWN
DATA DESCRIPTION
    VALUE OF #1360:
    IF VARIABLE#1263='SINGLE-ROW
    DEEP-GROOVE BALL BEARING' THEN
        VALUE RANGE= WITHIN TABLE #1090
    ELSE
        VALUE RANGE= WITHIN TABLE #1089
```
(B) 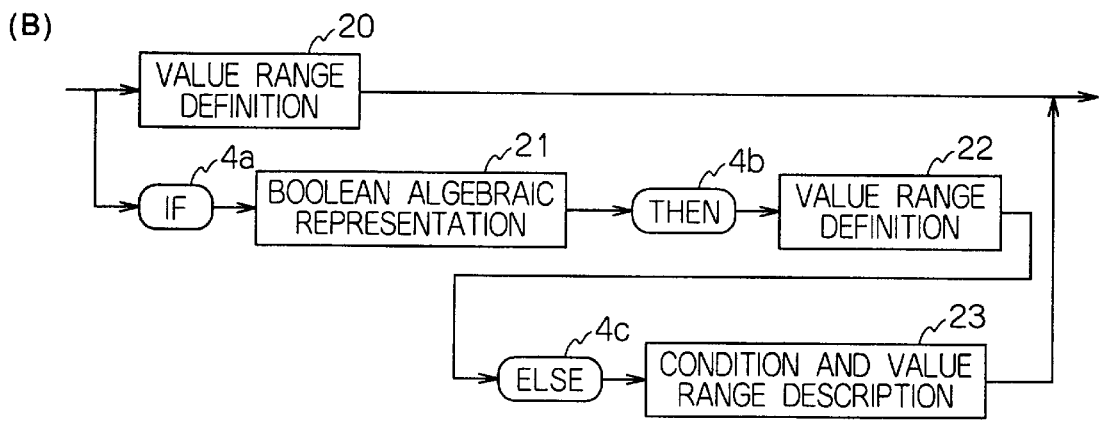
(C) 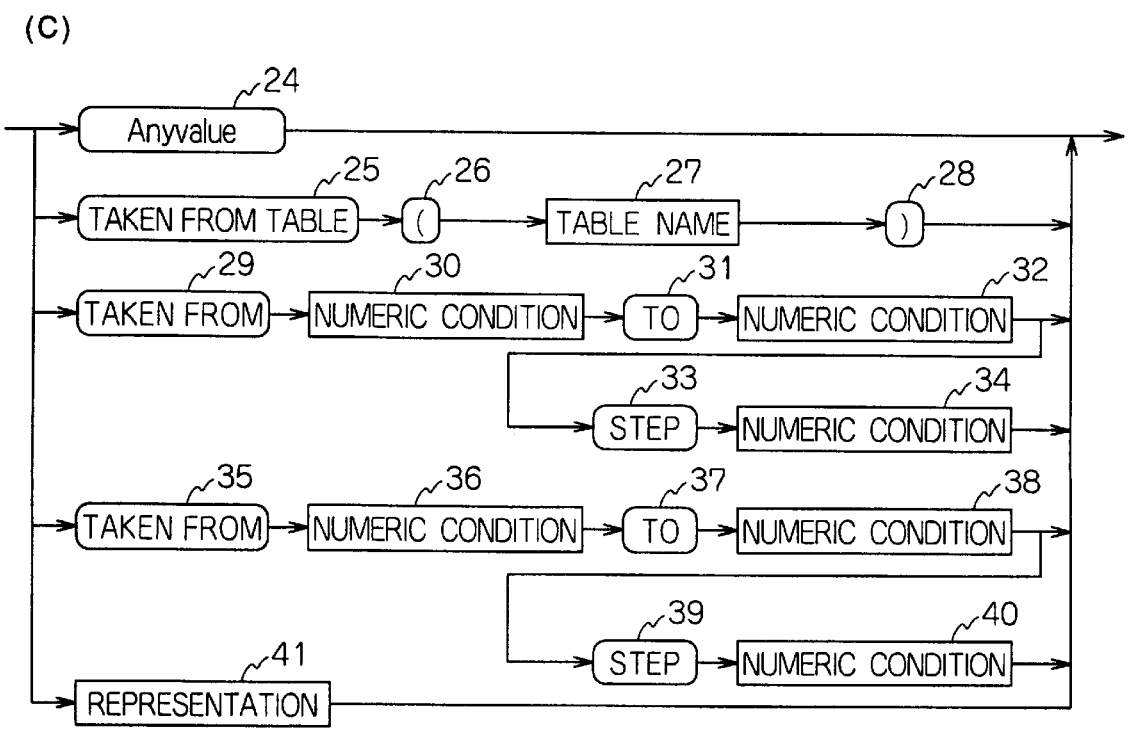

FIG.11

| PROPERTY NAME | VALUE RANGE |
|---|---|
| BEARING TYPE | Anyvalue |
| RADIAL LOAD | Anyvalue |
| ROTATING SPEED | Anyvalue |
| REQUIRED LIFE TIME | Anyvalue |
| BASIC RATING LIFE | IF BEARING TYPE = BALL BARING THEN(100000/(6×ROTATING SPEED))<br>× ((BASIC LOAD RATING/RADIAL LOAD))<br>×((BASIC LOAD RATING/RADIAL LOAD)^(10/3)) |
| NOMINAL NUMBER | BEARING TYPE = BALL BEARING THEN TakenFromTable (BALL BEARING TABLE)<br>ELSE TakenFromTable (ROLLING BEARING TABLE) |
| INSIDE DIAMETER | |
| OUTSIDE DIAMETER | |
| WIDTH | |
| DYNAMIC LOAD RATINGS | |
| SPEED RATING | |

FIG.12

| PROPERTY NAME | CONDITION |
|---|---|
| SPEED RATING | SPEED RATING >= ROTATING SPEED |
| BASIC RATING LIFE | BASIC RATING LIFE >= REQUIRED LIFETIME |

| PROPERTY NAME | VALUE RANGE |
|---|---|
| NUMBER OF PURCHASED UNITS | Anyvalue |
| UNIT PRICE | IF NUMBER OF PURCHASED UNITS<=1000 THEN 100 ELSE 80 |

(B)

| PROPERTY NAME | VALUE RANGE |
|---|---|
| USAGE TEMPERATURE | Anyvalue |
| MAXIMUM ALLOWABLE TEMPERATURE | Taken From Table (PROPERTY TABLE) |

| PROPERTY NAME | CONDITION |
|---|---|
| USAGE TEMPERATURE | USAGE TEMPERATURE <= MAXIMUM ALLOWABLE TEMPERATURE |

FIG.14

| | ROTATING SPEED | RADIAL LOAD | REQUIRED LIFE TIME | BEARING TYPE | BORE DIAMETER | OUTSIDE DIAMETER | WIDTH | DYNAMIC LOAD RATING | STATIC LOAD RATING | SPEED RATING | SPEED RATING | NOMINAL NUMBER | BASIC RATING LIFE |
|---|---|---|---|---|---|---|---|---|---|---|---|---|---|
| 1 | | | | SINGLE-ROW | 10 | 30 | 9 | 5100 | 2890 | 24000 | 30000 | 6200 | |
| 2 | | | | SINGLE-ROW | 12 | 32 | 10 | 6800 | 3050 | 22000 | 28000 | 6201 | |
| 3 | | | | SINGLE-ROW | 15 | 35 | 11 | 7650 | 3750 | 20000 | 24000 | 6202 | |
| 4 | | | | SINGLE-RO | | | | | | | 20000 | 6203 | |
| 5 | | | | SINGLE-RO | | | | | | | 18000 | 6204 | |
| 6 | | | | SINGLE-RO | | | | | | | 15000 | 6205 | |
| 7 | | | | SINGLE-RO | | | | | | | 13000 | 6206 | |
| 8 | | | | SINGLE-RO | | | | | | | 11000 | 6207 | |
| 9 | | | | SINGLE-RO | | | | | | | 10000 | 6208 | |
| 10 | | | | SINGLE-RO | | | | | | | 9000 | 6209 | |
| 11 | | | | SINGLE-RO | | | | | | | 8500 | 6210 | |
| 12 | | | | SINGLE-RO | | | | | | | 7500 | 6211 | |
| 13 | | | | SINGLE-ROW | 60 | 110 | 22 | 52500 | 36000 | 5600 | 7100 | 6212 | |
| 14 | | | | SINGLE-ROW | 65 | 120 | 23 | 57500 | 40000 | 5300 | 6300 | 6213 | |
| 15 | | | | SINGLE-ROW | 70 | 125 | 24 | 62000 | 44000 | 5000 | 6300 | 6214 | |
| 16 | | | | SINGLE-ROW | 75 | 130 | 25 | 66000 | 49500 | 4800 | 5600 | 6215 | |
| 17 | | | | SINGLE-ROW | 80 | 140 | 26 | 72500 | 5300 | 4500 | 5300 | 6216 | |
| 18 | | | | SINGLE-ROW | 85 | 150 | 28 | 84000 | 62000 | 4300 | 5000 | 6217 | |
| 19 | | | | SINGLE-ROW | 90 | 160 | 30 | 96000 | 71500 | 4000 | 4800 | 6218 | |

ENTER ROTATING SPEED

4500

× OK    × UNDO

✓ CLOSE    ⟳ RESET SELECTION    × UNDO

FIG. 15

| | ROTATING SPEED | RADIAL LOAD | REQUIRED LIFE TIME | BEARING TYPE | BORE DIAMETER | OUTSIDE DIAMETER | WIDTH | DYNAMIC LOAD RATING | STATIC LOAD RATING | SPEED RATING | SPEED RATING | NOMINAL NUMBER | BASIC RATING LIFE |
|---|---|---|---|---|---|---|---|---|---|---|---|---|---|
| ⊘ | 4500 | 2500 | 25000 | SINGLE-ROW | 10 | 30 | 9 | 5100 | 2890 | 24000 | 30000 | 6200 | 31.44 |
| ⊘ | 4500 | 2500 | 25000 | SINGLE-ROW | 12 | 32 | 10 | 6800 | 3050 | 22000 | 28000 | 6201 | 74.53 |
| ⊘ | 4500 | 2500 | 25000 | SINGLE-ROW | 15 | 35 | 11 | 7650 | 3750 | 20000 | 24000 | 6202 | 106.12 |
| ⊘ | 4500 | 2500 | 25000 | SINGLE-ROW | 17 | 40 | 12 | 9550 | 4800 | 17000 | 20000 | 6203 | 206.46 |
| ⊘ | 4500 | 2500 | 25000 | SINGLE-ROW | 20 | 47 | 14 | 12800 | 6600 | 15000 | 18000 | 6204 | 497.10 |
| ⊘ | 4500 | 2500 | 25000 | SINGLE-ROW | 25 | 52 | 15 | 14000 | 7850 | 13000 | 15000 | 6205 | 650.43 |
| ⊘ | 4500 | 2500 | 25000 | SINGLE-ROW | 30 | 62 | 16 | 19500 | 11300 | 11000 | 13000 | 6206 | 1757.60 |
| ⊘ | 4500 | 2500 | 25000 | SINGLE-ROW | 35 | 72 | 17 | 25700 | 15300 | 9500 | 11000 | 6207 | 4023.61 |
| ⊘ | 4500 | 2500 | 25000 | SINGLE-ROW | 40 | 80 | 18 | 29100 | 17800 | 8500 | 10000 | 6208 | 5841.11 |
| ⊘ | 4500 | 2500 | 25000 | SINGLE-ROW | 45 | 85 | 19 | 31500 | 20400 | 7500 | 9000 | 6209 | 7408.80 |
| ⊘ | 4500 | 2500 | 25000 | SINGLE-ROW | 50 | 90 | 20 | 35000 | 23200 | 7100 | 8500 | 6210 | 10162.9 |
| ⊘ | 4500 | 2500 | 25000 | SINGLE-ROW | 55 | 100 | 21 | 43500 | 29300 | 6300 | 7500 | 6211 | 19511.2 |
| 13 | 4500 | 2500 | 25000 | SINGLE-ROW | 60 | 110 | 22 | 52500 | 36000 | 5600 | 7100 | 6212 | 34300.0 |
| 14 | 4500 | 2500 | 25000 | SINGLE-ROW | 65 | 120 | 23 | 57500 | 40000 | 5300 | 6300 | 6213 | 45062.9 |
| 15 | 4500 | 2500 | 25000 | SINGLE-ROW | 70 | 125 | 24 | 62000 | 44000 | 5000 | 6300 | 6214 | 56492.5 |
| 16 | 4500 | 2500 | 25000 | SINGLE-ROW | 75 | 130 | 25 | 66000 | 49500 | 4800 | 5600 | 6215 | 68147.2 |
| 17 | 4500 | 2500 | 25000 | SINGLE-ROW | 80 | 140 | 26 | 72500 | 5300 | 4500 | 5300 | 6216 | 90329.6 |
| ⊘ | 4500 | 2500 | 25000 | SINGLE-ROW | 85 | 150 | 28 | 84000 | 62000 | 4300 | 5000 | 6217 | 140492. |
| ⊘ | 4500 | 2500 | 25000 | SINGLE-ROW | 90 | 160 | 30 | 96000 | 71500 | 4000 | 4800 | 6218 | 209715. |

ELECTRONIC CATALOG DATA CREATING AND/OR DISPLAYING APPARATUS AND METHOD

BACKGROUND OF THE INVENTION

The present invention relates to an electronic catalog data creating apparatus and more particularly to an electronic catalog data creating apparatus creating electronic parts-catalog data.

Conventionally, a parts maker has distributed paper catalogs to business firms and various manufacturers to provide them with the lists of available parts. Distributing this type of catalog, sometimes 1000 pages or more in volume, to all divisions of a manufacturer costs much and, in addition, requires the manufacturer to have a large storage space.

As the data processing technology has advanced, the method is now under study to prepare parts catalogs electronically and to supply them to manufacturers over wide-area networks such as the Internet. However, if this type of electronic catalog is created and distributed by each parts maker individually, manufacturers will find it confusing to read parts data whose format varies with the parts maker.

It is therefore desirable that parts makers provide electronic catalogs identical in data structure and data representation format. That is, electronic catalogs, if created by each parts maker according to a well-defined electronic catalog data structure standard, allow manufacturers, via a computer, to select parts from the electronic catalogs supplied by parts makers.

This need has led, for example, ISO (International Organization for Standardization) to start working on creating the standard for the structure of electronically-supplied data on products and parts. This data structure standard deals not only with parts properties but also with "selection conditions" which allow the user to calculate parts life time using property data or to include discount rate data to be applied to a customer who will purchase 1000 or more units at a time.

A "Selection condition" is knowledge used to select parts. For example, selection conditions for bearings include data on the basic load rating and the life time. Generally, the load rating is given as the numeric value of each part. On the other hand, the designer responsible for selecting parts calculates the lifetime according to the JIS(Japanese Industrial Standard)—defined lifetime calculation formula. The electronic catalog form, which is under study recently, electronically contains a lifetime calculation formula and, upon receiving a lifetime request, executes the lifetime calculation formula to extract parts within the required lifetime.

However, creating electronic catalog data in accordance with some specific standard requires that the user be familiar with the contents of the standard, meaning that, in many cases, it is difficult for each parts maker to study each standard and describe electronic catalog data directly.

In addition, describing selection conditions electronically is more difficult than describing them on paper because the data structures becomes more complicated.

Another problem is that the electronic catalog data structure standard drafted by ISO13584, for example, requires the user to specify data structure values using a special formats similar to that of character user interface commands. Thus, to create an electronic catalog, the user must understand the special format and system.

SUMMARY OF THE INVENTION

It is an object of the present invention to provide an electronic catalog data creating apparatus which solves the problems associated with the conventional apparatus and which allows the user to easily enter electronic catalog data, including selection conditions, to create electronic catalog data.

To achieve the above object, the electronic catalog data creating apparatus according to the present invention comprises a user interface through which a user enters parts data and a data converter which converts data, entered through the user interface, to a predetermined data format. The user interface, in turn, comprises property data input. means for receiving part property characteristics and its contents and value range input means for receiving the range of input or presentation values or presentation conditions of each property entered through the property data input means.

The value range input means also has a plurality of fields, each of which will accept the following three code descriptions: a code description indicating a value range check condition, a code description indicating a value range to be used when the value range check condition is satisfied, and a code description indicating a value range to be used when the value range check condition is not satisfied. On the other hand, the data converter comprises condition expression converting means. The condition expression converting means searches for a code entered through the value range input means and converts a value range check condition or a value range to a predetermined data structure according to the specified contents indicated by the code.

"Property" refers to the attribute of a part included n an electronic catalog. For a screw, the screw type, shank, head diameter, price, and so on are properties. The "lifetime" which is calculated with a selection formula containing variables dependent on some other property values is also a "property". The "lifetime" calculated with the formula is compared with the "required lifetime" entered by the selector and, according to the comparison result, whether or not the part is eligible for selection is displayed on the selector's computer. Note that the "required lifetime" entered by the selector is also a "property". In other words, the "property" is "parts data" used to identify a part and, especially, to select a part satisfying the specifications required for designing a product. This parts data is classified into three: uniquely identified parts data including price data entered by the parts maker or determined according to the part standard, parts data entered by the selector, and parts data calculated by the computer according to a formula containing variables dependent on the properties defined by the parts maker or entered by the selector. Parts data includes a supplier's name, part usage, usage environment requirement, shape, material, performance, operation condition, safety standard, and part selection formula.

The property data input means is an interface through which an electronic catalog data creator enters property characteristics and the property value of each part. The property characteristics include the data type and the data unit, and the property value is used, for example, when the data type is real. To request the electronic catalog data creator to enter data, the property data input means displays a window on the display to allow him or her to enter data. The electronic catalog data creator enters property data and then the value range of each property. The value range of a property refers to a range of values the property may use. For example, the value range is any value, a range (A to B), or a value which varies according to a value entered by the selector.

The value range input means has a plurality of fields, each of which will accept the following three code descriptions:

a code description indicating a value range check condition, a code description indicating a value range to be used when the value range check condition is satisfied, and a code description indicating a value range to be used when the value range check condition is not satisfied. The electronic catalog creator enters a condition expressed in Boolean algebra, a value range to be used when the condition is true, and a value range to be used when the condition is false, each preceded by a specific code. For example, if the value range check condition is A, the value range to be used when the condition is true is B, and the value range to be used when the condition is false is C, then the electronic catalog creator enters "IF A THEN B ELSE C" into the field of the value range input means. In this case, each of IF, THEN, and ELSE is a code description. For a value range which depends on some other factors, the condition causing the value range to change is thought of as the condition used to evaluate the condition (value range evaluation condition). For example, when the value range of the "price", one of parts properties, depends on the number of purchased units, the value range check condition is "the number of purchased units". In this example, because the evaluation result of the value range check condition must be true or false, a Boolean algebraic representation producing a unique result, such as "whether or not the number of purchased units exceeds some specific number, is used.

The data converter searches for a code entered through the value range input means and converts the value range check condition or the value range to a description with a predetermined data structure according to the contents specified by the code. The predetermined data structure is, for example, the description in accordance with a standard such as ISO13584. Therefore, specifying selection conditions for the IF statement with the use of codes produces electronic catalog data with the predetermined data structure.

The electronic catalog data creating method according to the present invention converts a content entered via a computer by a person responsible for creating an electronic parts-catalog into electronic catalog data having a predetermined data structure and composed of parts property values and parts selection expressions. The predetermined data structure is, for example, a standardized representation format. This method comprises three steps: in the first step, when a condition code description indicating that the entered content is a value range check condition, the condition is converted to the predetermined data structure; in the second step, when a true condition code description indicating that the entered content is the value range to be used when the condition is true, the value range is converted; and in the third step, when a false condition code description indicating that the entered content is the value range to be used when the condition is false, the value range is converted.

Although, in the above-described creating apparatus, property value ranges are specified by the IF statement coded in the specific field on the value range definition sheet, the code converted in the first process need not be entered by a person responsible for creating an electronic catalog. That is, on a sheet having three fields the first of which is used to receive a condition, the interface (input means) may assign a code indicating that the content entered in this field is a condition. With a more graphical user interface, the interface may automatically assign a condition code to the entered content logically connected to an icon indicating the condition. Or, based on the position where the entered content is read, the interface may interpret that the entered content is a condition. That is, for an input content explicitly indicated by the person who enters electronic catalog that the entered content is a condition for property value ranges, the method according to the present invention converts the entered content to a description with a predetermined data structure. This applies not only to the condition but also to the value range to be used when the condition is satisfied and to the value range to be used when the condition is not satisfied.

The scope of this application includes the ability to accept an input including a plurality of value ranges specified with the use of the IF statement but not the subsequently-generated data with a predetermined structure and their descriptions. That is, the patent does not include the electronic catalog data description standard in accordance with ISO13584; it includes a software product creating electronic catalog data in accordance with the standard and, more particularly, a method enabling a parts data supplier to enter selection knowledge easily.

It is evident that the predetermined data structure includes not only the standard stipulated by ISO13584 but also in-house standards and so on. The interface with the parts data supplier, introduced by the present invention, may be used for any data structure defined by any standard.

The apparatus and the method according to the present invention, which are configured and work as described above, cause the data converter to search for a code entered via the value range input means and, at the same time, convert a condition and value ranges to a predetermined data structure according to the contents indicated by the code. Therefore, the apparatus and the method allows the electronic catalog data creator to enter data in an easy-to-understand format and to create electronic catalog data with a complex structure. This makes it possible to include parts selection knowledge, such as selection formulas and properties dependent on other properties, into electronic catalog data easily. This also allows the parts selector to select parts, required to satisfy the design needs of a product, electronically and easily.

BRIEF DESCRIPTION OF THE DRAWINGS

FIG. 3 is a diagram showing an example of electronic catalog data created in the embodiment with the configuration and processing flow shown in FIGS. 1 and 2.

FIG. 6 is a diagram showing an example of property characteristics definitions used in the embodiment of the present invention.

FIG. 7 is a diagram showing an example of property definitions used in the parts of a class. FIG. 7(A) is a diagram showing an example of property definitions, and FIG. 7(B) is a diagram showing an example of entered values.

FIG. 8(A) shows the overall data description section, and

FIG. 8(B) shows the details of the condition and value range description section.

FIG. 9 is a diagram showing an example of electronic catalog data description of the data structure shown in FIG. 8.

FIG. 10 is a diagram showing the description format of the value range definition used in the embodiment. FIG. 10(A) shows an example of IF statement description, FIG. 10(B) shows the specification format of the IF statement, and FIG. 10(C) shows other codes used for entering value ranges FIG. 11 is a diagram showing an example of value ranges entered on the value range definition sheet using the codes shown in FIG. 10.

FIG. 12 is a diagram showing an example of contents entered on the condition definition sheet corresponding to the value range definition sheet shown in FIG. 11.

FIG. 13 is a diagram showing other examples of contents entered on the value range definition sheet and the condition definition sheet. FIG. 13(A) shows an example of how the unit price changes as the number of purchased units changes, and FIG. 13(B) shows an example of parts selection which is done according to the values entered by the selector.

FIG. 14 is a diagram showing an example of electronic catalog data created in the embodiment.

FIG. 15 is a diagram showing an example of selector's input in response to the electronic catalog data shown in FIG. 14.

DESCRIPTION OF THE PREFERRED EMBODIMENTS

An embodiment according to the present invention will be described with reference to the attached drawings.

Figure 1:
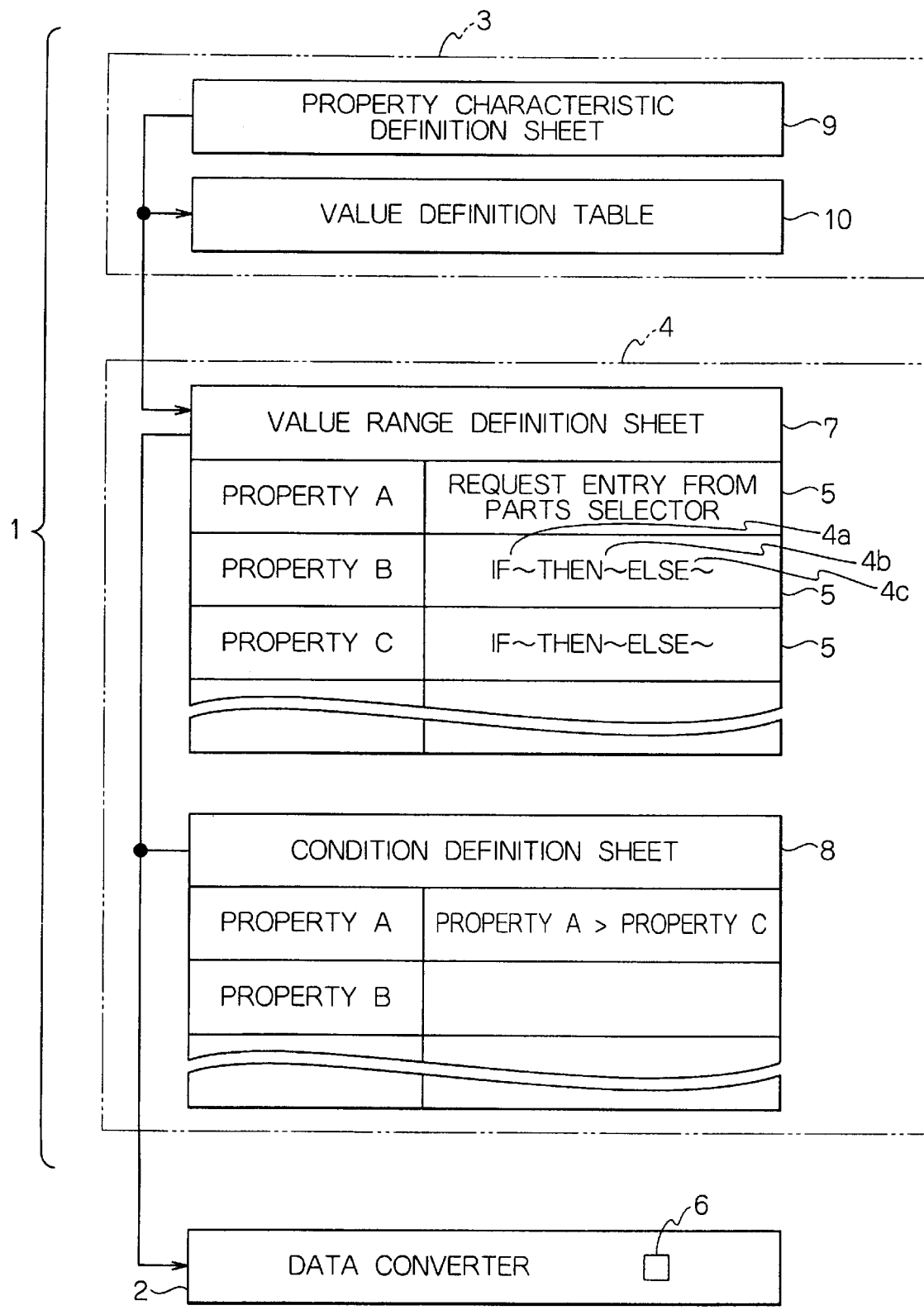
FIG. 1 is a block diagram showing the configuration of an embodiment of the present invention.

FIG. 1 is a block diagram showing an electronic catalog data creating apparatus according to the present invention. The electronic catalog data creating apparatus comprises a user interface 1 through which the user enters parts data and a data converter 2 which converts data, entered through the user interface 1, to a predetermined data format. The user interface 1, in turn, comprises property data input means 3 for receiving part property characteristics and its contents and value range input means 4 for receiving the range of input or presentation values or presentation conditions of each property entered through the property data input means 3.

The value range input means 4 also has a plurality of fields 5, each of which will accept the following three code descriptions: a code description 4a indicating a value range check condition, a code description 4b indicating a value range to be used when the value range check condition is satisfied, and a code description 4c indicating a value range to be used when the value range check condition is not satisfied. On the other hand, the data converter 2 comprises condition expression converting means 6. The condition expression converting means 6 searches for a code entered through the value range input means 4 and converts a value range check condition or a value range to a predetermined data structure according to the specified contents indicated by the code.

The codes 4a, 4b, and 4c entered through the value range input means 4 are, for example, text data described as "IF", "THEN", and "ELSE", respectively. "IF" indicated by the code 4a specifies that the following description is a value rankle check condition which will be evaluated as either true or false. "THEN" indicated by the code 4b specifies that the following description is a value range to be used when the condition is satisfied. "ELSE" indicated by the code 4c specifies that the following description is a value range to be used when the condition is not satisfied. These codes need not be IF . . . THEN . . . ELSE. Any other codes, such as ON . . . DO1 . . . DO2, may also be used as long as they represent a value range check condition, a value range to be used when the condition is satisfied, and a value range to be used when the condition is not satisfied, respectively.

This "IF-THEN" format allows an electronic catalog creator to describe parts selection conditions and so on easily even if parts data cannot be uniquely defined in advance and the description is complex. In this example, the electronic catalog creator may enter two alternatives one of which will be selected depending upon whether or not the condition is satisfied.

The value range to be used when the value range check condition(description following ELSE) is not satisfied may recursively include another three code descriptions: the code description (e.g., "IF") 4a indicating a second value range check condition, the code description (e.g., "THEN) 4b indicating a value range to be used when the second value range check condition is satisfied, and the code description (e.g., "ELSE") 4c indicating a value range to be used when the second value range check condition is not satisfied. The following shows an example of the recursive description.

IF A THEN B ELSE IF C THEN D ELSE IF E THEN F ELSE G

This recursive description means that: if A, then the value range is B; if C, then the value range is D; if C, then the value range is D; if E, then the value range is F; if none of A, C, and E, then value range is G.

The ability to describe any number of value range check conditions after ELSE with the use of the IF statement puts no limit on the number of conditions and therefore enables the user to describe more detailed parts data easily. For example, assume that the unit price is $100 if the requested number of units is 1000 or less, $80 if the requested number of units is 1001 to 2000, and $60 if the requested number of units is 2001 or more. Complex parts data like this may be coded easily by using a plurality of IF statements. The data converter 2 interprets these IF statements and converts them to electronic catalog data having the predetermined structures, eliminating the need for the catalog creator to be familiar with data structure details.

The value range input means 4 comprises a value range definition sheet 7 and a condition definition sheet 8. On the value range definition sheet 7, value ranges are defined for each property entered through the property data input means 3; on the condition definition sheet 8, the conditions that must be satisfied by the value ranges defined on the value range definition sheet 7 are defined. The value ranges defined on the value range definition sheet 7 are displayed when a selector selects a part. Whether or not a property requires input from the selector and whether or not the property value has already been entered or already been stored in the dictionary are defined. For a property whose value range varies according to an input from the selector, the IF statement is defined. For example, when there are two parts types each with its own value ranges, the property "parts type" requests input from the selector and the values ranges dependent on the entered parts type are defined by the IF statement.

On the value range definition sheet 7, three codes, 4a, 4b, and 4c, are entered. The data converter 2 converts the input to electronic catalog data with the predetermined data structure according to the entered codes. On the condition definition sheet 8, relational expressions or logical expressions, each containing properties as variables, are entered. Unlike conditions specified for the IF statement, conditions specified on the condition definition sheet 8 are those conditions that must be satisfied by the value ranges when electronic catalog data is displayed.

In other words, the conditions specified on the condition definition sheet 8 are the design requirements that must be satisfied when selecting parts. For example, each part to be used in manufacturing requires a specific level of precision. Let this "required precision" be property A, and let the precision of the part be property C. The value range of the property C is defined on the value range definition sheet 7. And, when the electronic catalog is displayed and the selector enters the "required precision" of the part, only those parts satisfying the condition defined on the condition definition sheet are selected. That is, even if the parts selector enters only numeric values but not a condition, the parts satisfying the condition are selected automatically on the electronic catalog data display; this is because the parts catalog creator has already specified, on the condition definition sheet, the condition that must be satisfied by the value ranges.

It may be said that the expression specifies a condition which determines whether the part supplied by a parts maker is recommended for the specifications requested by parts customers. The electronic catalog data creator enters on the condition definition sheet 8 the conditions that must be satisfied by the value ranges of a property. Whether or not the indicator shown in the selection result display area is displayed is determined by whether not the value range satisfies the condition.

The data converter 2 divides an input to each property, defined on the value range definition sheet 7, into the following three according to three codes 4a, 4b, and 4c: a condition, a value range to be used when the condition is satisfied, and a value range to be used when the condition is not satisfied. Then, the data converter 2 converts each entered content into a data description with the predetermined data structure. In addition, the data converter 2 converts conditional expressions, entered on the condition definition sheet 8, into descriptions with the predetermined data structure; these conditional expressions, either relational or logical, use the entered properties as variables.

With the apparatus having the above configuration, the parts selector can calculate parts lifetimes which have been calculated using formulas listed in paper catalogs and, in addition, select parts satisfying a required precision under certain conditions. Another advantage is the interface which allows the catalog creator to use the IF statement and Boolean algebra to determine whether the value range is eligible for selection. Therefore, the catalog creator can create an electronic catalog which has the amount of selection knowledge much larger than that of a conventional paper catalog.

Preferably, the property data input means 3 comprises a property characteristic definition sheet 9 and a value definition table 10. On the property characteristic definition sheet 9, the unit of each property and the property characteristic data indicating whether or not the property is eligible for output are defined. In the value definition table 10, the value of each property defined on the property characteristic definition sheet 9 is defined if that value exists. The sheet and the table allow all data required for creating an electronic catalog to be entered via sheets (windows) displayed on the computer display. This interface displays the property characteristic definition sheet 9 and the value definition table 10 separately so that the catalog creator can understand them easily.

Figure 2:
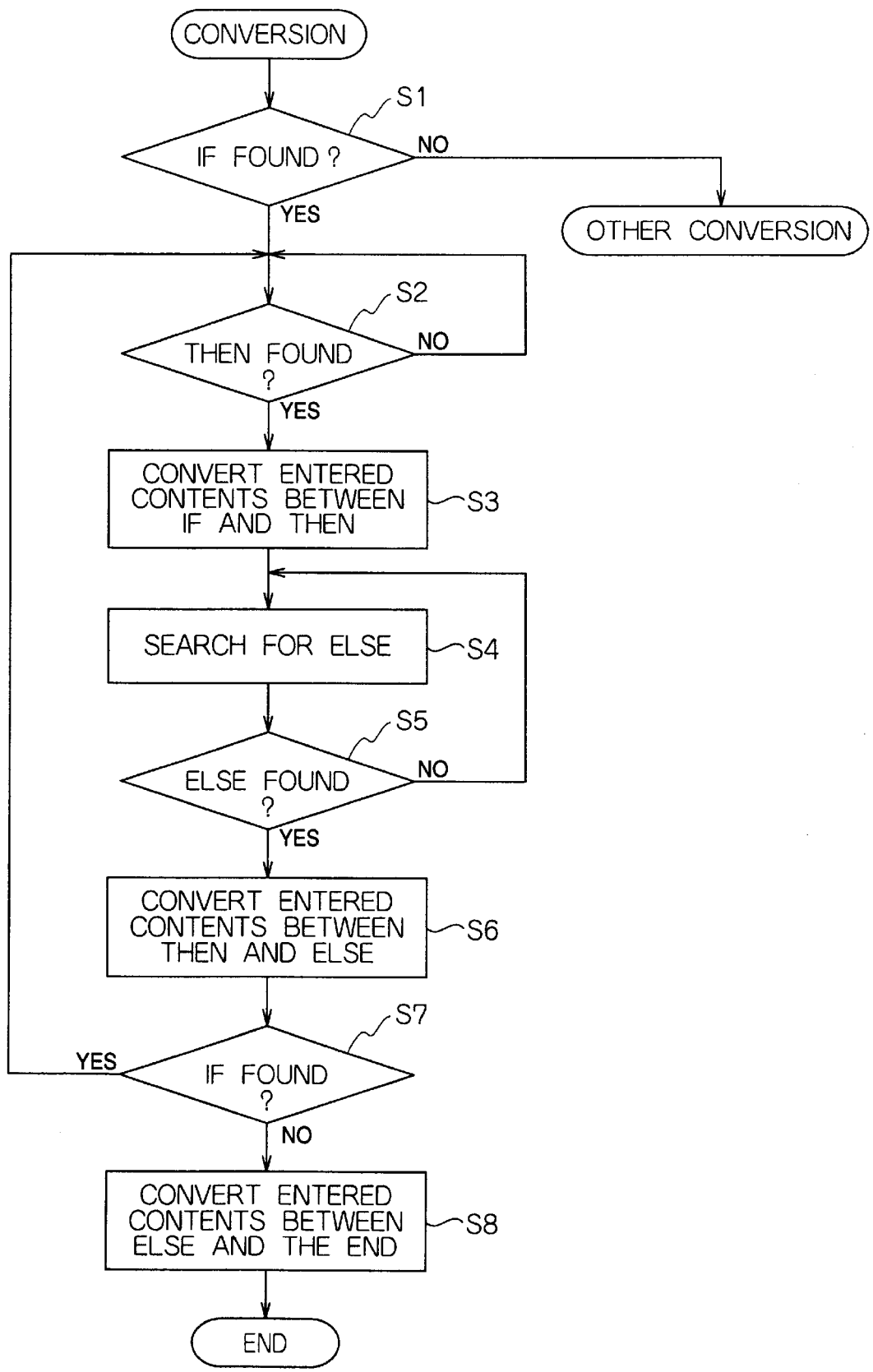
FIG. 2 is a flowchart showing an example of conversion executed by the data converter shown in FIG. 1.

FIG. 2 is a flowchart showing how the properties of a part, described with the IF statement, are converted to predetermined data structure descriptions. To convert the contents entered into the value range definition sheet, a check is made to see if "IF(condition code)" is present in the field of the sheet (Si). If no "IF" is found, usual conversion processing is performed. If "IF" is found in the field, a check is made to see if "THEN" is present in the field (S2). If "THEN" is found, the input contents from "IF" to "THEN" are converted (S3, first process). Then, a check is made to see if "ELSE" is present (S4). If "ELSE" is present, the input contents to "ELSE" are converted (S6, second process).

The contents appearing after "ELSE" are converted and, usually, processing ends at this point. However, if "IF" appears after "ELSE" recursively, a check is made, after step S6, to see if "IF" is present. If "IF" is found, a check is made to see if "THEN" is present (S2). Because another "ELSE" appears, another check is made to see if "IF" is present (S7). These steps are repeated recursively until IF is no longer found. Then, the contents from the ELSE to the end of the statement are converted to the predetermined data structure (S3, third process). As described above, a check is made, in step S7, to see if another IF is present and, if it is, control is passed back to step S2. This allows a recursive IF statement in the field 5 to be processed correctly.

The electronic catalog data creating apparatus shown in FIG. 1 may be implemented on a computer on which the electronic catalog creating program runs. This electronic catalog creating program may be supplied on a CD-ROM or CC. It may also be sent over networks. The electronic catalog creating program, which relies on the computer and its operating system, causes the computer to operate as the electronic catalog data creating apparatus.

The electronic catalog creating program comprises the following commands: a command which causes the property characteristic definition sheet 9, prompting the user to enter data on the characteristics and contents of parts properties, to be displayed; a command which causes the value range definition sheet 7, prompting the user to enter the definition of the value range of each property entered into the property characteristic definition sheet 9, to be displayed; a command which causes the condition definition sheet 8, on which the output conditions for the value ranges defined on the value range definition sheet 7 are defined, to be displayed; and a command which causes the contents on each sheet to be converted to predetermined data structures. In the above description, "a command which causes something to do" means that the command, once read by the CPU of the computer, works as a program and the CPU runs according to the instructions contained in the program.

Either only the above-described commands cause the computer to run or the above-described commands and CPU-provided commands work together to display sheets. For example, the electronic catalog creating program may not include commands for managing windows each corresponding to a sheet. A program which runs the computer while relying on the computer operating system is also a command "which causes something to do."

The commands which cause the contents on each sheet to be converted to the predetermined data structure include commands which cause the contents of the value range definition sheet 7 to the data structure descriptions according to a code description indicating a value range check condition, a code description indicating a value range to be executed when the value range check condition is satisfied, and a code description indicating a value range to be executed when the value range check condition is not satisfied.

When the electronic catalog data creating program receives input, via the computer, from the parts electronic catalog creator, it converts its contents to electronic catalog data having the predetermined data structure and composed of parts property values and parts selection expressions. The program has three commands: the first command which, upon reading a condition code description indicating that the input is a value range check condition, converts the condition to the predetermined data structure, the second command which, upon reading a code description indicating a value range to be used when the value range check condition is satisfied, converts the value range, and the third command which, upon reading a code description indicating a value range to be used when the value range check condition is not satisfied, converts the value range. FIG. 2 shows processing when each command is run.

The following describes an example of an electronic catalog data display. On this electronic catalog data display is displayed the electronic parts-catalog data having the predetermined data structure description and created by the electronic catalog data creating apparatus shown in FIG. 1. This display is provided for use by the parts selector. It comprises a reader reading electronic catalog data, a data converter converting the electronic catalog data to electronic catalog data for display, and a display controller displaying on the display means the electronic catalog data converted by the data converter.

Referring to FIG. 3, the display controller has the display sheet 9 with parts properties as the horizontal axis and the parts as the vertical axis. The display sheet 9 also has the property state display area 10.

The display controller also displays in the property status display area 10 a first description 13 indicating that the property is a value read from the electronic catalog data, a second description 43 indicating that the property is requesting input from the user (see FIG. 14), and a third description 42 (see FIG. 14) indicating that the property is obtained by executing an expression, defined as electronic catalog data, when the property values used to calculate that property are defined (property characteristic display control means). In the example shown in FIG. 3, the descriptions 1 to 3 are indicated by icons such as question marks and hand marks. They need not be icons; the may be displayed as character strings.

As with the electronic catalog data creating apparatus, this type of electronic catalog data display may also be implemented by an electronic catalog display program running in the computer and the processor within the computer which runs the program.

Figure 4:
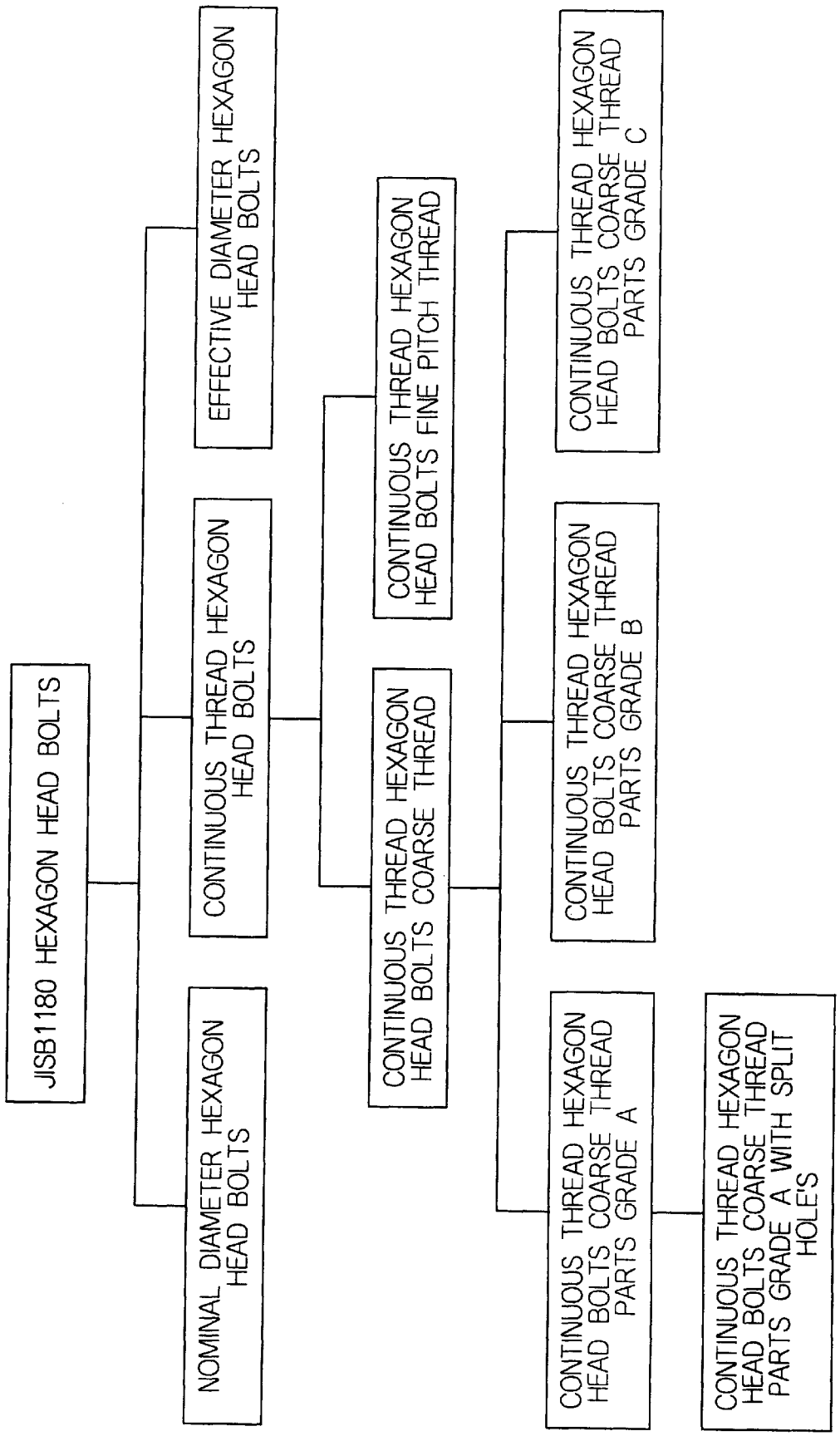
FIG. 4 is a diagram showing the classification of hexagon head bolts.

As described earlier, the property of a part is one of the following three types of data: data inherent in each part such as the outside diameter, data whose value range is defined by a formula (such as the lifetime that is calculated using the outside diameter and so on), and data to be entered by the parts selector as a request for selecting parts. Although the electronic catalog creator defines these properties to create electronic catalog data, the parts selector may find it difficult to distinguish the properties. To help the parts selector to distinguish these properties, the characteristic of each property is displayed in an easy-to-understand format using icons, as shown in FIGS. 3 and 4.

The display controller also has a selection result display area 11 on the display sheet 9. This area contains an indicator indicating whether or not the part satisfies the user's request. The display controller displays, on the display sheet, all parts of a class requested by the user. When the display controller receives a request from the user and one or more parts do not satisfy the user's request, it displays a description 14 indicating that those parts do not satisfy the request (selection result display control means).

FIG. 3 shows the display sheet for which the selector has entered property A and property B. For example, assume that the field of property C in the value range definition sheet 7 shown in FIG. 1 contains the IF statement specifying "if property B is format 1" and that, if the condition is satisfied, "the value is 10 if the part is part 1". In this case, when the property B is determined, the value of the property C is determined. If the property C is the "shank length (mm)" of the part "screw" and if the selector of the screw requests a screw whose shank length be 20 mm or longer, the selector enters "20" in the property A (length of the screw to be used). Because part 5 and the following parts have the shank length of 20 mm or longer, the display controller displays the description 14 for the not-selected parts to indicate that those parts do not satisfy the request. Electronic catalog with the predetermined data structure is displayed in this display format so the parts selector can understand the electronic catalog data easily.

Next, the embodiment of the present invention will be described with bolts and bearings as examples. FIG. 4 shows an example of class hierarchy of hexagon head bolts. In general, parts are classified according to the hierarchy structure shown in FIG. 4. In the conventional paper catalog, even when nominal diameter hexagon head bolts, continuous thread hexagon bolts, and effective diameter hexagon head bolts are identical in external appearance, they must be shown individually in tables. That is, even if only parts with the external appearance of 10, 12, and 14 are available, they are listed on separate pages. "Class inheritance", one of concepts introduced by the object-oriented programming technology, is available for use with electronic data. The class inheritance allows the contents defined in a higher class to be quoted in a lower class. When class inheritance is used, properties or actual property values need be entered only once.

Figure 5:
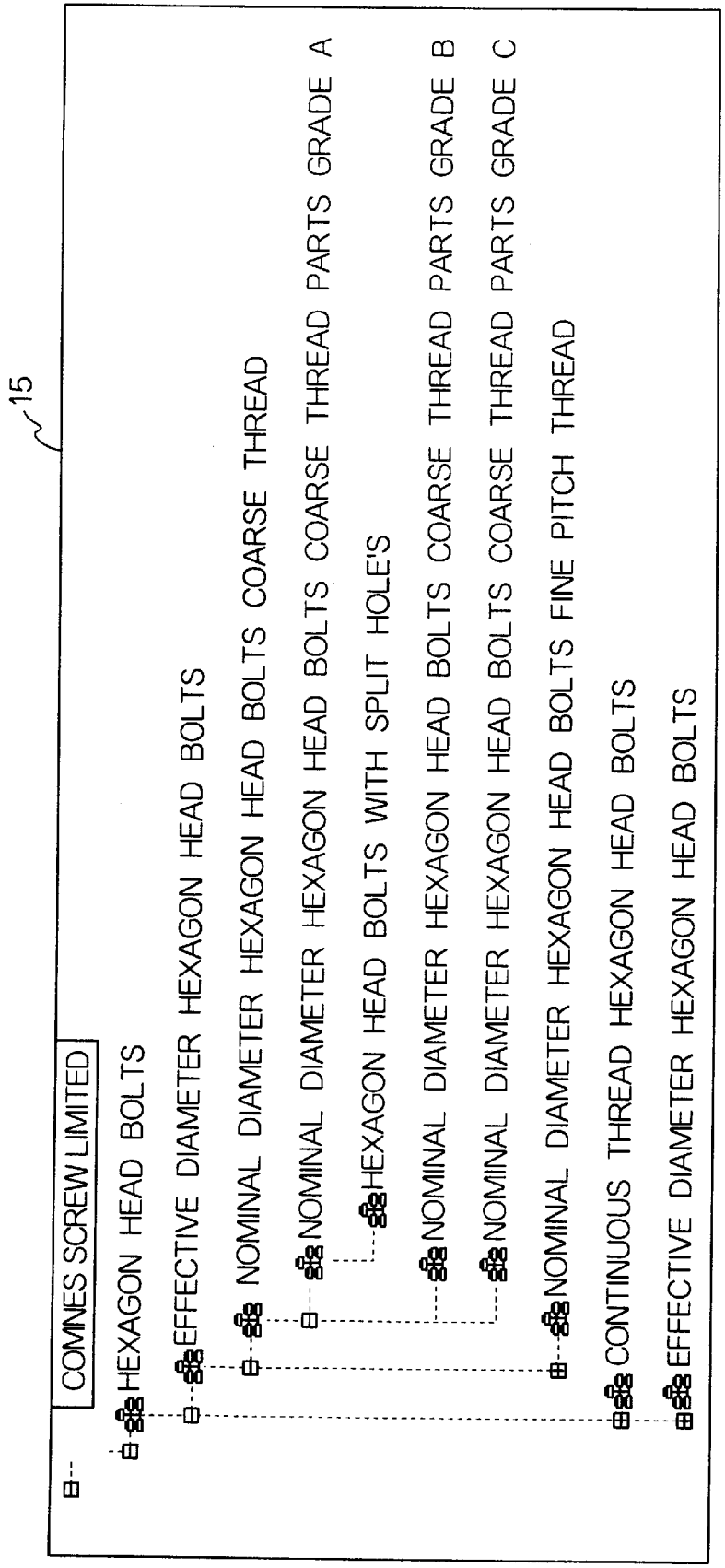
FIG. 5 is a diagram showing an example of the hierarchy structure used in the embodiment of the present invention.

The properties of electronic catalog data shown in FIG. 3 are defined for each class before creating it. For example, to create electronic catalog data in accordance with ISO13584, the supplier classifies their parts and creates an outline 15 as shown in FIG. 5. Then, the characteristics of properties used by all parts shown in FIG. 5 are defined.

Referring to FIG. 6, property names, short names, units, and data types are defined on the property characteristic definition sheet 9. The short name of a property defined by the standard may be displayed when the name of the property is entered, or the name of a property may be automatically assigned when the short name is entered. Then, the properties for which values must be entered are defined for each class. Referring to FIG. 7(A), the properties to be used by a class are defined using a value range definition table 10A and then actual values are entered as shown in FIG. 7(B).

Next, the value range of each property is defined using the value range definition sheet 7. For the properties whose values are defined in the value definition table 10, the value range of a property is identified by describing the table name. The value ranges of properties to be defined by the IF statement are entered using the value range definition sheet 7.

Figure 8:
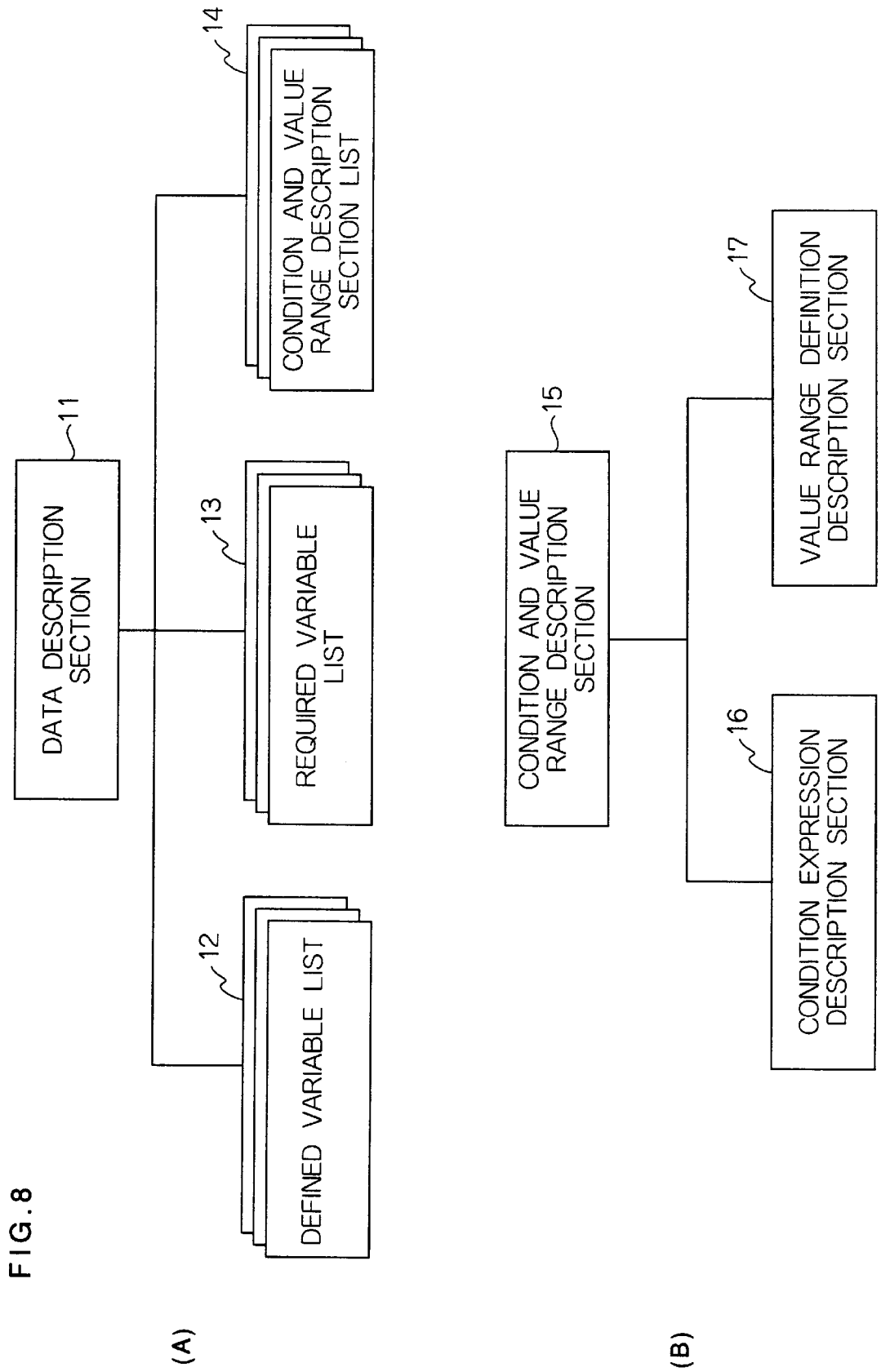
FIG. 8 is a diagram showing the predetermined data structure of electronic catalog data used in the embodiment.

FIG. 8 shows the data structure of value range descriptions (data description section 11), and FIG. 9 shows the actual representation of electronic catalog data based on this data structure. An expression preceded by #, shown in the table indicated by 18, is a computer-readable expression; humans must learn a lot to master this description and, in addition, the description is very difficult to read. In particular, the need to describe value ranges based on the data structure shown in FIG. 8 is another reason why the description, shown in the table indicated by 18, is difficult. For example, the description of a condition requires the description of variables used in the condition. In other words, if the value range of a property depends on other properties, the properties on which the property depends must be declared in advance. In general, this is a complicated task. In this case, the description using the IF statement shown in FIG. 1 is much easier for the catalog creator. For a property specified with the IF statement, the computer reads other properties and declares the properties necessary to declare the property according to the structure shown in FIG. 8.

Once the data structure shown in FIG. 8 is entered, the computer analyzes it as follows. First, if the values of the variables in the required variable list are known, the conditions and the value range description sections included in a "condition and value range description section list" 14 are checked to find a "condition and value range description section 15" in which the conditional expression described in a condition expression description section 16 is satisfied. The value range described in a value range definition description section 17 described in the "condition and value range description section 15" that was found are the value ranges of the variables in variable list defined in the data description section. Data is analyzed according to the above procedure; in general, the expression format shown in FIG. 10(A) is more straightforward and easy for humans to understand.

That is, the expression format indicated by 19 has a requirement section and a data description section. In the requirement section, it is stated that the value of some variable is known. When this value is known, the value of the variable #1360 is identified. For example, if variable #1263 contains the character string "single-row deep-groove ball bearing", then the value range is within table 1090; else, the value range is within table 1089.

This shows that the format shown in FIG. 10(B) should be used to receive input in order to facilitate the creation of electronic catalog data with the structure defined by ISO13584. The IF statement is used to receive all data necessary to create electronic catalog data with the data structure shown in FIG. 8. Another advantage is that the IF statement, which is used to create a program, is easy for humans to code. As shown in FIG. 10(B), the IF code 4a indicates that the subsequent description is a Boolean algebra expression 21. The Boolean algebra expression 21 may be a logical expression which is evaluated as true or false. The THEN code 4b indicates that the value range definition 22 is a value that is used when the condition is true. The ELSE code 4c indicates the value range definition 23 is a value that is used when the condition is false. Here, "condition and value range description" indicated by 23 means that ELSE may be followed by another recursive IF statement.

FIG. 10(C) shows an example of a description which defines a value range. In this example, the codes shown in FIG. 10(C) are used to specify data on the value range definition sheet 7 and the condition definition sheet 8. "Anyvalue" 24 is a code indicating that the property may take any value. "TakenFromTable" 25 is a code indicating that the value of the property is specified by a table name 27 of the value definition table 10. When using TakenFromTable 25, enclose the name by parentheses 26 and 27 to indicate that the description is the name of a table. "TakenFrom" indicates that the value range has a range of values. "TakenFrom 29" is used to describe a numeric condition 30. For a part, 1 m to 10 m, which is sold by the piece in increments of 0.5 m, the numeric condition 30 is described as follows:

TakenFrom 1 to 10 step 0.5

In this description, the unit defined previously as the characteristic of the property is used. From the numeric condition, control flows into two directions: one into step 33 and the other into the end of the description. This indicates that step 33 is optional. If a part may be sold in any length as long as its length is in the range 1 m to 10 m, step 33 is omitted.

TakenFrom 35 is used to define, not a numeric value itself, but a value range with other properties as variables. For example, TakenFrom 35 is used in such a case when the property A is determined by other property values and the property B is the maximum length determined according to other properties. That is, when there are two properties determined by two properties, such as safety and load, TakenFrom 35 is used to receive input between these two properties as follows:

TakenFrom property A to property B

As shown above, the numeric condition 30 is used to enter a numeric value itself, while a numeric representation 36 is used when other properties are used as variables. In addition, a direct representation 41 is used, for example, to represent a relation between properties or whether or not a character string match occurs. Therefore, when the electronic catalog creator defines value ranges, all he or she has to do is understand the contents shown in FIG. 10 and use them according to the characteristic of the parts property. There is no need to understand the data structure shown in FIG. 8 and its description shown in FIG. 9.

It should be noted that the Anyvalue 24 and TakenFrom 29 and 35 are provided to limit values to be entered by the parts selector who has received electronic catalog data. On the other hand, the IF statement and the TakenFromTable 25 limit the value ranges to be used when electronic catalog is presented. The representation 41 is a conditional expression used to display selection results in the selection result display area shown in FIG. 3 Referring to FIG. 11, the value range definition sheet 7 for the bearing are filled in, for example, with "Anyvalue 24" and the IF statement. Because Anyvalue implies that values are entered by the selector, the parts supplier need only to define properties. Because the calculation coefficients of the basic rating life vary according to the bearing type (ball bearings and rolling bearings), two calculation expressions are used in the IF statement. The values of entries from "nominal number" to "speed rating" also vary according to the bearing type; therefore, the corresponding table is read when the selector enters the bearing type.

Referring to FIG. 12, the condition for the speed rating and the condition for basic rating life are specified in the condition definition sheet 8 corresponding to the value range definition sheet 7 shown in FIG. 11. As shown in FIG. 11, the calculation of the basic rating life requires the property entered by the selector: "bearing type", "radial load", and "rotating speed". Once the bearing type is entered, the value of "dynamic load rating" is read from the table according to the bearing type. When the values of these properties are defined, the IF statement is executed to calculate the basic rating life. A request requesting that the basic rating load be equal to or larger than the required life time entered by the selector is entered in the condition definition sheet 8. Then, the parts satisfying this condition are extracted from the list of parts and are displayed.

The value range definitions and condition definitions may be used in many ways. FIG. 13 shows an example. For example, when the number of purchased units is a property to be entered by the selector, the IF statement is defined with this number as Anyvalue. And, the "Unit Price", which is one of parts properties, is defined as having a value range dependent on the number of purchased units. In this example, the IF statement shown in FIG. 13(A) is defined to indicate that the unit price is $100 when the number of purchased units is 1000 or less and that $80 when the number of purchased units exceeds 1000.

Another example is shown in FIG. 13(B). In this example, the usage temperature of a part is a property to be entered by the selector, and the maximum allowable temperature is read from the table named "PROPERTY" defined by the value definition table. An expression is described in the condition definition sheet 8, with properties as variables, to express that the usage temperature must be equal to or lower than the maximum allowable temperature. When this electronic catalog is displayed, the parts with the maximum allowable temperature higher than the usage temperature entered by the selector are distinguished from others. Thus, the contents of the value range definition sheet are useful in defining the value ranges of the property, while the contents of the condition definition sheet are useful in displaying parts for selection.

FIGS. 14 and 15 show examples of electronic catalog data on bearings that is displayed on the electronic catalog data display for use by the selector. FIG. 14 shows an example before the parts selector enters data. Bearing properties are shown from left to right in the order: "Rotating Speed, RS", "Radial Load, RL", "Required Life Time, RLT", "Baring Type, BT", "Bore Diameter, BD", "Outside Diameter, OD", "Width, W", "Dynamic Load Rating, DLR", "Static Load Rating, SLR", "Speed Rating [Grease], SPG", "Speed Rating [Oil], SRO", "Nominal Number", and "Basic Rating Life".

"Rotating Speed", "Radial Load", and "Required Life Time" are properties defined by the electronic catalog data creator as "Anyvalue" or "TakenFrom", as shown in FIG. 11. A display 43 indicating that data may be entered is displayed in the property status display area 10. A key mark icon is used in this example. For the property "Bearing Type", "Ball Baring" has already been entered by the parts selector. For a property for which a value has already been entered, a display 12 is shown. In this example, a hand-shaped icon is used.

The property values dependent on the value of some other property are read from the corresponding table. For example, in FIG. 11, the values of inside diameter, outside diameter, and nominal number, which are dependent on the bearing type, are read from the table. Some of these values are entered by the electronic catalog data creator, while others are read from a dictionary containing data on the properties common to all parts makers when the selector has such a dictionary. The parts maker provides those selectors, who want to use this dictionary, with information on the property codes. A question mark icon 13 is displayed for the properties whose codes are provided but whose values are not yet determined.

A computer mark icon 42 indicates that the contents of the property are calculated based on other properties. For example, because the "Basic Rating Life" of bearings is calculated from the rotating speed and the radial load, the parts maker specifies the property value ranges in the selection formula as shown in FIG. 11. For the properties for which selection formulas are already supplied by the part maker, the computer mark icon 42 is used in this embodiment to indicate that the property does not require input from the parts selector.

In FIG. 14, the selector is requested to enter the rotating speed. And, when the radial load and the required life time are entered, the basic rating life 42 (right end of FIG. 15) is calculated automatically. Although not shown to the user, conditional expressions are given to the required life time and the number of rotations as shown in FIG. 12.

The icon 14 shows that the parts whose nominal numbers ranges from 6212 to 6216 satisfy the condition.

Electronic catalog data which also includes knowledge required to select parts makes the parts selection process easier and, at the same time, the parts selection process is performed electronically. However, in many cases, creating electronic catalog data which is displayed in the format described above is not easy. To solve this problem, the IF statement and the interface allowing a conditional expression containing other property names as variables are used in this embodiment. This makes electronic catalog data creation much easier and, as a result, the distribution of electronic catalog data of parts makes parts transactions much easier.

In the examples shown in FIGS. 14 and 15, the selection knowledge—that is, the IF statement entered by the parts supplier—is not shown to the selector. Electronic catalog data, when supplied to the selector, no longer includes the IF statement but has the predetermined data structure. It is considered, however, that the IF statement allows the selector to understand the parts selection knowledge. With this in mind, the data structure shown in FIGS. 8 and 9 are converted to the IF statement in another embodiment. That is, for each "condition and value range description section 15" included in the "condition and value range description section list 14", the next process is repeated.

First, conditional expressions are created and converted to a character string in the form "IF conditional expression THEN". Then, value range definitions are created and added to the end of "IF conditional expression THEN". If "condition and value range description section list" 14 includes another value range definition description section 17, the character string "ELSE" is added to the end and, after that, the value ranges are added. If the electronic catalog data creating apparatus contains a file containing the description shown in FIG. 9, the data converter 2 may convert the file automatically when the file is read. Or, upon receiving a request from the selector, the electronic catalog data display may display the selection knowledge composed of IF statements.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-262853 (Filed on Sep. 10, 1998) including specification, claims, drawings and summary are incorporated herein by reference in its entirety.

What is claimed is:

1. An electronic catalog data creating method for converting a content entered via a computer by a person responsible for creating an electronic parts-catalog into electronic catalog data having a predetermined data structure and composed of parts property values and parts selection expressions, said method comprising the steps of:

when a condition code description indicating that said entered content is a value range check condition, converting the condition to the predetermined data structure;

when a true condition code description indicating that said entered content is a value range to be used when said condition is true, converting the value range; and when a false condition code description indicating that said entered content is the value range to be used when said. condition is false, converting the value range.

2. The electronic catalog data creating method according to claim 1, further comprising the steps of:

when said condition code is read, interpreting a description after said condition code and before the next true code as said condition; and when said true code is read, interpreting the description after said true code and before the next false code as the value range for a true condition.

3. The electronic catalog data creating method according to claim 1, further comprising the steps of:

when said false code description is read, checking if said condition code appears next;

when said condition code is found, the first to third converting steps are repeated recursively; and when said condition code is not found, interpreting the description after said false code and before an end of the description starting at said condition code as the value range to be used when said condition is false.

4. A computer program product stored on a storage medium for creating electronic catalogs using a computer, wherein the program causing the computer to:

display a property entry sheet for prompting for parts property characteristics and contents;

display a value range definition sheet for prompting for a value range definition of each property entered on said property entry sheet;

display a condition definition sheet on which conditions to be satisfied by value ranges entered on said value range definition sheet are defined; and convert contents entered on said value range definition sheet into descriptions with a predetermined data structure according to whether a code description indicates that an entered content is a value range check condition, whether the code description indicates the value range to be used when the value range check condition is satisfied, and whether the code description indicates the value range to be used when the value range check condition is not satisfied.

5. A computer program product stored on a storage medium for converting a content entered via a computer by a person responsible for creating an electronic parts-catalog into electronic catalog data with a predetermined data structure, said electronic catalog data composed of parts property values and parts selection expressions, wherein the program causes the computer to:

convert a value range check condition to the predetermined data structure when a condition code description indicates that said entered content is the value range check condition;

convert a value range when a true condition code description indicates that said entered content is the value range to be used when said value range check condition is true; and convert the value range when a false condition code description indicates that said entered content is the value range to be used when said value range check condition is false.

6. An electronic catalog data creating apparatus comprising a user interface for receiving parts data and a data converter for converting the parts data received via the user interface to a predetermined data structure, wherein said user interface comprises:

a property data input means for receiving data on characteristics and contents of part properties; and a value range input means for receiving an entry value range or a presentation value range of each property or a presentation condition of the property, said value range input means having a plurality of fields each of which receives a code description indicating that the entered content is a value range check condition, the code description indicating that the entered content is the value range to be used when said value range check condition is satisfied, and the code description indicating that the entered content is the value range to be used when said value range check condition is not satisfied; and wherein said data converter comprises:

condition expression converting means for searching for the code received by said value range input means and for converting said value range check condition and the value ranges to the predetermined data structure according to the content indicated by the code.

7. The electronic catalog data creating apparatus according to claim 6, wherein said codes received by said value range input means are text data described as "IF", "THEN", and "ELSE", respectively.

8. The electronic catalog data creating apparatus according to claim 6 wherein said value range to be used when said value range check condition is not satisfied further includes recursively the code description indicating that the entered content is the value range check condition, the code description indicating that the entered content is the value range to be used when said value range check condition is satisfied, and the code description indicating that the entered content is the value range to be used when said value range check condition is not satisfied.

9. An electronic catalog data creating apparatus comprising a user interface for receiving parts data and a data converter for converting the parts data received via the user interface to a predetermined data structure, wherein said user interface comprises:

property data input means for receiving data on characteristics and contents of part properties; and value range input means for receiving an entry value range or an presentation value range of each property or a presentation condition of the property, said value range input means having a value range definition sheet on which a value range is defined for each property entered via said property data input means and a condition definition sheet on which conditions to be satisfied by the value ranges defined on the value range definition sheet are defined; and wherein said data converter comprises:

condition expression converting means for searching for a code received by said value range input means and for converting a value range check condition and the value ranges to the predetermined data structure according to the content indicated by the code.

10. The electronic catalog data creating apparatus according to claim 9, wherein said data converter comprises means for dividing the content entered on said value range definition sheet for each property into the value range check condition, the value range to be used when the value range check condition is satisfied, and the value range to be used when the value range check condition is not satisfied and for converting the entered content to the predetermined data structure.

11. The electronic catalog data creating apparatus according to claim 9, wherein said data converter comprises means for converting a relational or logical expression entered on said condition definition sheet into the predetermined data structure, said expression using said properties as variables.

12. The electronic catalog data creating apparatus according to claim 9, wherein said property data input means comprises:

a property characteristic definition sheet on which a unit of each of said properties and property characteristic data indicating whether or not the property satisfies the condition are defined; and a value definition table on which a value for each part is defined when there is an actual value for each property defined on the property characteristic definition sheet.

13. An electronic catalog data display method for displaying electronic catalogs on a display connected to a computer, wherein said computer comprises:

a reader reading electronic catalog data created by an electronic catalog data creating apparatus and having a predetermined data structure, a data converter converting the electronic catalog data to the electronic catalog data for use in display, and a display controller displaying the electronic catalog data converted by the data converter on said display, said display method comprising the steps of:

defining a display sheet in which properties of each part are displayed;

setting up, on the display sheet, a property status display area for indicating a status of each property;

displaying a property read from said electronic catalog data through said reader as a first type;

executing an expression which is part of the electronic catalog data and displaying a result of execution as a second type when a value of the property included in the expression is determined;

displaying the property which is a request from an electronic catalog data user as a third type; and displaying, in said property status display area, a first, second, or third description indicating that a content of the displayed property is the first, second, or third type.

14. The electronic catalog data display method according to claim 13, further comprising the steps of:

setting up a selection result display area on said display sheet to indicate whether or not each part satisfies the request from the user;

displaying all parts in a class specified by the user; and for the part not satisfying the request from the users, adding a description indicating that the part does not satisfy the request.

15. A computer program product stored on a storage medium for displaying electronic catalog data using a computer, wherein said computer comprises a reader reading the electronic catalog data created by an electronic catalog data creating apparatus and having a predetermined data structure, a data converter converting the electronic catalog data to the electronic catalog data for use in display, and a display controller displaying the electronic catalog data converted by the data converter on said display and wherein the program causes the computer to:

define a display sheet in which properties of each part is displayed;

set up, on the display sheet, a property status display area for indicating a status of each property;

display the property read from said electronic catalog data through said reader as a first type;

execute an expression which is part of the electronic: catalog data and display a result of execution as a second type when a value of the property included in the expression is determined;

display the property which is a request from an electronic catalog data user as a third type; and display, in said property status display area, a first, second, or third description indicating that a content of a displayed property is the first, second, or third type.

16. The computer program product according to claim 15, wherein the computer program further causes the display controller of said computer to:

set up a selection result display area on said display sheet to indicate whether or not each part satisfies the request from the user;

display all parts in a class specified by the user; and for the part not satisfying the request from the user, add a description indicating that the part does not satisfy the request.

17. A electronic catalog data display comprising a reader reading electronic parts-catalog data created by an electronic catalog data creating apparatus and having a predetermined data structure, a data converter converting the electronic catalog data to the electronic catalog data for use in display, and a display controller displaying the electronic catalog data converted by the data converter on display means, wherein said display controller comprises a display sheet on which the electronic catalog data is displayed, with parts properties and parts as the horizontal axis and the vertical axis of the display sheet respectively, said display sheet having a property status display area to indicate a status of each property, and wherein said display controller also comprises property characteristic display control means for displaying a first description indicating that the property is read from said electronic catalog data, a second description indicating that the property is a request from a user, and a third description indicating that, when a value of the property included in an expression which is part of the electronic catalog data is determined, the property is determined by executing the expression.

18. The electronic catalog data display according to claim 17, wherein said display controller sets up a selection result display area on said display sheet to indicate whether or not each part satisfies the request from the user; displays all parts in a class specified by the user; and, for the part not satisfying the request from the user, adds a description indicating that the part does not satisfy the request.

* * * * *

UNITED STATES PATENT AND TRADEMARK OFFICE
CERTIFICATE OF CORRECTION

PATENT NO. : 6,072,481
DATED : June 6, 2000
INVENTOR(S) : S. MATSUSHITA et al.

It is certified that error appears in the above-identified patent and that said Letters Patent is hereby corrected as shown below:

At column 15, line 6 (claim 1, line 16) of the printed patent, after "said" delete --- . ---.

At column 17, line 53 (claim 14, line 7) of the printed patent, "users" should be ---user---.

At column 18, line 11 (claim 15, line 17) of the printed patent, after "electronic" delete --- : ---.

Signed and Sealed this

Eighth Day of May, 2001

NICHOLAS P. GODICI

*Attest:*

*Attesting Officer*  *Acting Director of the United States Patent and Trademark Office*